US009509516B2

(12) United States Patent
Cho et al.

(10) Patent No.: US 9,509,516 B2
(45) Date of Patent: Nov. 29, 2016

(54) APPARATUS AND METHOD FOR PROVIDING DIGITAL SIGNATURE

(71) Applicant: ELECTRONICS AND TELECOMMUNICATIONS RESEARCH INSTITUTE, Daejeon (KR)

(72) Inventors: Young-Seob Cho, Daejeon (KR);
Soo-Hyung Kim, Daejeon (KR);
Jong-Hyouk Noh, Daejeon (KR);
Sang-Rae Cho, Daejeon (KR);
Jin-Man Cho, Daejeon (KR);
Dae-Seon Choi, Daejeon (KR);
Seung-Hyun Kim, Daejeon (KR);
Seok-Hyun Kim, Daejeon (KR);
Seung-Hun Jin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 68 days.

(21) Appl. No.: 14/617,187

(22) Filed: Feb. 9, 2015

(65) Prior Publication Data
US 2015/0229479 A1 Aug. 13, 2015

(30) Foreign Application Priority Data
Feb. 10, 2014 (KR) ........................ 10-2014-0014991

(51) Int. Cl.
*H04L 29/06* (2006.01)
*H04L 9/32* (2006.01)
*H04L 9/08* (2006.01)

(52) U.S. Cl.
CPC ........... *H04L 9/3247* (2013.01); *H04L 9/0861* (2013.01); *H04L 9/3263* (2013.01); *H04L 2209/805* (2013.01)

(58) Field of Classification Search
CPC . H04L 9/3247; H04L 9/0861; H04L 9/3263; H04L 9/0822; H04L 63/0442; H04L 2009/805; H04L 2463/062; H04L 2463/041
IPC ...................................................... H04L 9/3247
See application file for complete search history.

(56) References Cited

U.S. PATENT DOCUMENTS 7,028,180 B1 *  4/2006  Aull .................... G06F 21/335
                                                    713/156
7,194,620 B1 *  3/2007  Hayes ................... H04L 9/3263
                                                    380/280

(Continued)

FOREIGN PATENT DOCUMENTS

KR    10-2003-0088603 A    11/2003
KR    10-2011-0117744 A    10/2011

(Continued)

*Primary Examiner* — Krisna Lim
(74) *Attorney, Agent, or Firm* — Rabin & Berdo, P.C.

(57) ABSTRACT

Disclosed are an apparatus and method for providing a digital signature. The apparatus includes a certificate unit, an input unit receives a selection input for a certificate related to signature content received from a signature-requesting terminal, and a control unit for determining whether the certificate unit is capable of performing a digital signature function corresponding to a selected certificate. If the certificate unit is capable of performing the digital signature function, the certificate unit creates a digital signature based on a private key corresponding to the selected certificate when the control unit commands the certificate unit to create a digital signature. Further, if the certificate unit is not capable of performing the digital signature function, the control unit creates a digital signature based on a private key corresponding to a certificate selected from the certificate unit. The control unit transmits the digital signature to the signature-requesting terminal.

20 Claims, 11 Drawing Sheets

(56) References Cited

U.S. PATENT DOCUMENTS

| | | | |
|---|---|---|---|
| 7,240,366 B2 * | 7/2007 | Buch | H04L 29/06027 380/225 |
| 8,291,231 B2 | 10/2012 | Ueno et al. | |
| 8,468,340 B2 * | 6/2013 | Moore | H04L 9/3268 380/277 |
| 2006/0112419 A1 * | 5/2006 | Brown | H04L 63/0428 726/5 |
| 2006/0206712 A1 * | 9/2006 | Dillaway | H04L 9/3247 713/176 |
| 2007/0136361 A1 | 6/2007 | Lee et al. | |
| 2009/0319796 A1 * | 12/2009 | Kim | H04L 63/0823 713/176 |
| 2010/0161969 A1 * | 6/2010 | Grebovich | H04L 9/321 713/156 |
| 2010/0185864 A1 * | 7/2010 | Gerdes, Jr. | H04L 9/3213 713/175 |
| 2011/0296191 A1 * | 12/2011 | Mouille | G06F 21/645 713/176 |
| 2012/0166337 A1 | 6/2012 | Park et al. | |
| 2014/0006788 A1 * | 1/2014 | Ignatchenko | H04L 63/0428 713/175 |
| 2014/0254796 A1 * | 9/2014 | Li | H04L 9/3247 380/246 |
| 2014/0380058 A1 * | 12/2014 | Agarwal | H04L 9/083 713/176 |

FOREIGN PATENT DOCUMENTS

| | | |
|---|---|---|
| KR | 10-2011-0134973 A | 12/2011 |
| KR | 10-2012-0071982 A | 7/2012 |
| KR | 10-2013-0033524 A | 4/2013 |
| KR | 10-2013-0095363 A | 8/2013 |
| WO | WO 2009-060899 A1 | 5/2009 |

\* cited by examiner

APPARATUS AND METHOD FOR PROVIDING DIGITAL SIGNATURE

CROSS REFERENCE TO RELATED APPLICATION

This application claims the benefit of Korean Patent Application No. 10-2014-0014991 filed Feb. 10, 2014, which is hereby incorporated by reference in its entirety into this application.

BACKGROUND OF THE INVENTION

1. Technical Field

The present invention relates to an apparatus and method for providing a digital signature.

2. Description of the Related Art

When engaging in electronic commerce (e-commerce), digital (electronic) signature technology for electronically providing a personal signet using a certificate has been widely used in various fields such as online banking and the cyber trading of stocks. A digital signature provides security and convenience in a large number of e-commerce activities by functioning as a user's signet for e-commerce, thus contributing to rapid activation of online e-commerce services. Further, certificates have become essential in real life to such an extent that most adults who engage in economic activities in a domestic area are assigned certificates and use the certificates.

Such digital signature technology has been used in such a way that a user accesses a server for providing an online service, creates a digital signature on a personal computer (PC) or a smart terminal, and transfers signature content to the server through the PC or smart terminal. That is, existing digital signature technology is chiefly used in a situation in which a user is connected online to a service provider.

However, recently, with the rapid popularization of smart terminals such as smart phones or smart pads, which provide an Internet access function and on which various applications can be freely installed and used by users, e-commerce services have been activated even in an offline environment in which a user and a service provider perform trading in a face-to-face manner.

Therefore, an apparatus and method capable of providing a digital signature that may be intuitively and conveniently used by a user in an offline face-to-face trading environment are currently required.

In connection with this, Korean Patent Application Publication No. 10-2013-0095363 discloses a technology related to "Cash Remittance Method Based on Digital Codes Using Hash Function and Electronic Signature".

SUMMARY OF THE INVENTION

Accordingly, the present invention has been made keeping in mind the above problems occurring in the prior art, and an object of the present invention is to provide an apparatus and method that are capable of providing a digital signature in an offline environment.

An apparatus for providing a digital signature according to an embodiment of the present invention includes a certificate unit; an input unit for receiving a selection input for a certificate related to signature content received from a signature-requesting terminal; and a control unit for determining whether the certificate unit is capable of performing a digital signature function corresponding to a selected certificate, wherein, if it is determined that the certificate unit is capable of performing the digital signature function, the certificate unit creates a digital signature based on a private key corresponding to the selected certificate when the control unit commands the certificate unit to create a digital signature, wherein, if it is determined that the certificate unit is not capable of performing the digital signature function, the control unit creates a digital signature based on a private key corresponding to a certificate selected from the certificate unit, and wherein the control unit transmits the digital signature to the signature-requesting terminal.

The apparatus may further include a short-range communication unit, wherein when a touch with the signature-requesting terminal is made, the control unit receives the signature content from the signature-requesting terminal through the short-range communication unit.

When the certificate unit is located outside of the apparatus, the short-range communication unit may receive the digital signature from the certificate unit when the certificate unit is touched. The short-range communication unit may be a Near-Field Communication (NFC) module.

The apparatus may further include an external communication unit for receiving the signature content from the signature-requesting terminal through a server.

The external communication unit may transmit the digital signature to the signature-requesting terminal.

The signature content may be encrypted using an encryption key by the signature-requesting terminal and the encryption key may be generated based on a security code by the signature-requesting terminal; and the control unit may generate an encryption key based on the security code, and decrypt the signature content using the encryption key.

The external communication unit may receive a partially hidden security code, together with the signature content, through the server, and the control unit may be configured to, when the input received through the input unit matches a hidden field of the security code, generate an encryption key based on the security code.

The external communication unit may receive session information corresponding to the signature content received by the server, transmit a user identifier to the server in response to the session information, and receive signature content transmitted from the server when the user identifier matches a user identifier transmitted from the signature-requesting terminal to the server.

The user identifier may be user information that has been shared with the signature-requesting terminal in advance.

Further, a method for providing a digital signature according to an embodiment of the present invention includes receiving, by an input unit, a selection input for a certificate related to signature content received from a signature-requesting terminal; determining, by a control unit, whether the certificate unit is capable of performing a digital signature function corresponding to a selected certificate; if it is determined that the certificate unit is capable of performing the digital signature function, creating, by the certificate unit, a digital signature based on a private key corresponding to the selected certificate when the control unit commands the certificate unit to create a digital signature; if it is determined that the certificate unit is not capable of performing the digital signature function, creating, by the control unit, a digital signature based on a private key corresponding to a certificate selected from the certificate unit; and transmitting, by the control unit, the digital signature to the signature-requesting terminal.

The method may further include, when a touch with the signature-requesting terminal is made, receiving the signature content from the signature-requesting terminal through a short-range communication unit.

The method may further include, when the certificate unit is located outside, receiving, by the short-range communication unit, the digital signature from the certificate unit when the certificate unit is touched. The short-range communication unit may be a Near-Field Communication (NFC) module.

The method may further include receiving, by an external communication unit, the signature content from the signature-requesting terminal through a server.

The method may further include transmitting, by the external communication unit, the digital signature to the signature-requesting terminal.

The signature content may be encrypted using an encryption key by the signature-requesting terminal, and the encryption key may be generated based on a security code by the signature-requesting terminal; and the method may further include generating, by the control unit, the encryption key based on the security code, and decrypting, by the control unit, the signature content using the encryption key.

The method may further include receiving, by the external communication unit, a partially hidden security code, together with the signature content, through the server; and generating, by the control unit, an encryption key based on the security code when the input received through the input unit matches a hidden field of the security code.

Receiving, by the external communication unit, the signature content from the signature-requesting terminal through the server may include receiving, by the external communication unit, session information corresponding to the signature content received by the server; transmitting, by the external communication unit, a user identifier to the server in response to the session information; and receiving, by the external communication unit, signature content transmitted from the server when the user identifier matches a user identifier transmitted from the signature-requesting terminal to the server.

The user identifier may be user information that has been shared with the signature-requesting terminal in advance.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
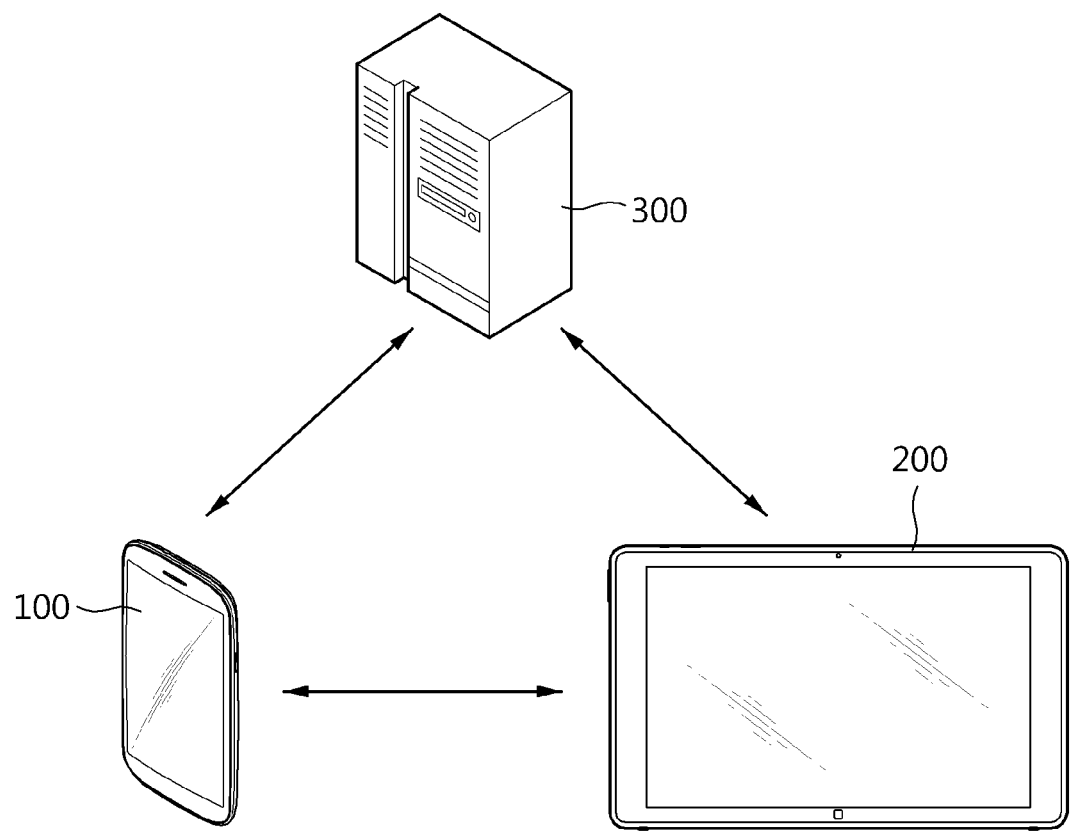
FIG. 1 is a block diagram showing a system for providing a digital signature according to an embodiment of the present invention.

Embodiments of the present invention are described with reference to the accompanying drawings in order to describe the present invention in detail so that those having ordinary knowledge in the technical field to which the present invention pertains can easily practice the present invention. However, the present invention may be implemented in various forms and is not limited by the following embodiments. In the drawings, the illustration of components that are not directly related to the present invention will be omitted for clear description of the present invention. Further, the same reference numerals are used to designate the same or similar elements throughout the drawings.

Throughout the entire specification and claims, it should be understood that a representation indicating that a certain part "includes" a component means that other components, not described, may be further included, without excluding a possibility that one or more other components will be added, unless a description to the contrary is specifically pointed out in context.

Further, throughout the entire specification, it should be understood that a representation indicating that a first component is "connected" to a second component may include the case where the first component is electrically connected to the second component with some other component interposed therebetween, as well as the case where the first component is "directly connected" to the second component.

Hereinafter, an apparatus and method for providing a digital signature according to embodiments of the present invention will be described in detail with reference to the attached drawings.

In the following description, individual communication units of a mobile terminal transmit and receive data and information, but the present invention is not limited to such a structure. That is, a control unit may transmit and receive data and information through each communication unit.

First, a digital signature provision system according to an embodiment of the present invention will be described with reference to FIG. 1.

FIG. 1 is a block diagram showing a digital signature provision system according to an embodiment of the present invention.

The digital signature provision system according to the embodiment of the present invention includes a mobile terminal 100, a signature-requesting terminal 200, and a server 300.

The mobile terminal 100 of the present invention may include a mobile phone, a smart phone, a notebook computer (laptop computer), a digital broadcasting terminal, a Personal Digital Assistant (PDA), a Portable Multimedia Player (PMP), a navigation terminal, etc. However, those skilled in the art will appreciate that the configuration according to the embodiment described in the present specification may also be applied to fixed terminals, such as a digital TV or a desktop computer, with the exception of cases that may be applied only to the mobile terminal 100.

The signature-requesting terminal 200 according to the embodiment of the present invention transmits signature content to the mobile terminal 100, and receives a digital signature from the mobile terminal 100. Further, the signature-requesting terminal 200 transmits the signature content and terminal information to the server 300.

The server 300 receives the signature content and the terminal information from the signature-requesting terminal 200. Further, the server 300 receives a digital signature from the mobile terminal 100, and transmits the digital signature to the signature-requesting terminal 200.

Below, individual components of a digital signature provision apparatus will be described in detail with reference to FIG. 2.

Figure 2:
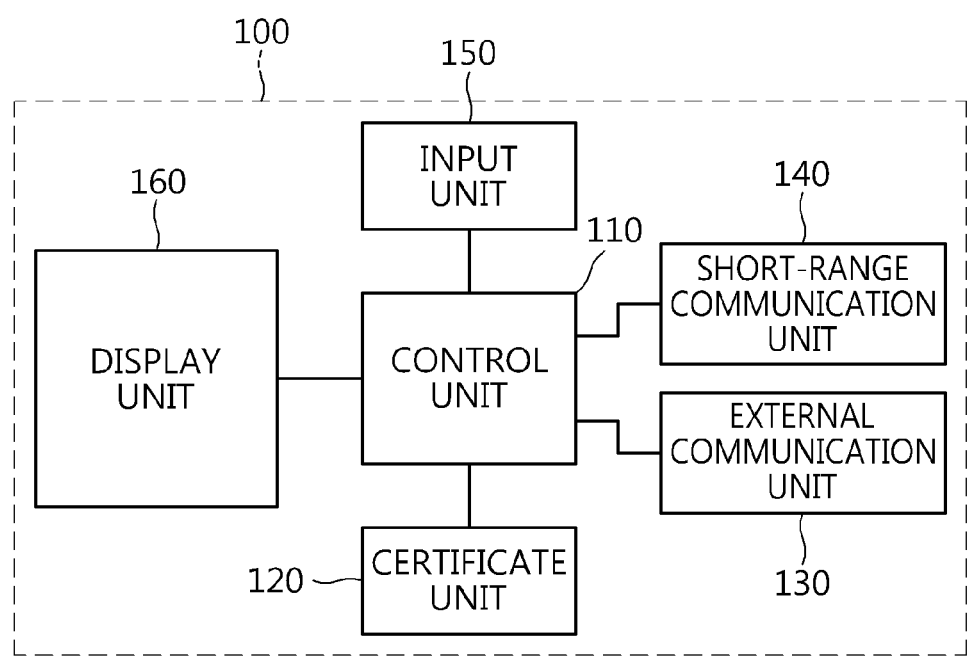
FIG. 2 is a block diagram showing an apparatus for providing a digital signature according to an embodiment of the present invention.

FIG. 2 is a block diagram showing a digital signature provision apparatus according to an embodiment of the present invention.

In the present specification, the digital signature provision apparatus may be a mobile terminal 100. Therefore, a description will be made on the assumption that the digital signature provision apparatus is the mobile terminal 100.

The mobile terminal 100 according to the embodiment of the present invention includes a control unit 110, a certificate unit 120, an external communication unit 130, a short-range communication unit 140, an input unit 150, and a display unit 160. However, since the components shown in FIG. 1 are not always essential, the mobile terminal 100 may be implemented using more components or fewer components than those of FIG. 1.

The control unit 110 controls the overall operation of the mobile terminal 100. The control unit 110 may create a digital signature based on a private key.

The certificate unit 120 includes one or more certificates. Further, the certificate unit 120 may create digital signatures based on private keys corresponding to the certificates. In FIG. 2, the mobile terminal 100 includes the certificate unit 120, but the present invention may also be applied to a case where a separate certificate unit 120 is located outside of the mobile terminal 100.

The certificate unit 120 according to the embodiment of the present invention may include an Integrated Circuit (IC) card-type certificate card that enables non-contact short-range wireless communication and a certificate Secure Element (SE) that can be embedded in a smart phone. A certificate SE may be a Universal Integrated Circuit Card (UICC) managed by a mobile communication company, or a Secure Digital (SD) card that can be inserted into and used in an SD slot. Further, the certificate unit 120 may have a digital signature function for creating digital signatures corresponding to respective certificates. Furthermore, the certificate unit 120 may store private keys corresponding to the certificates. Also, when the certificate unit 120 does not have a digital signature function, private keys corresponding to certificates may be stored in the certificate unit 120.

The external communication unit 130 receives signature content from the server 300. Further, the external communication unit 130 transmits a digital signature to the server 300.

The external communication unit 130 may transmit and receive wireless signals to and from at least one of a base station, an external terminal, and the server over a mobile communication network. The wireless signals may include a voice call signal, a video call signal, or various types of data based on the sending/receiving of text/multimedia messages.

The external communication unit 130 may include a communication module that uses Wireless Local Area Network (WLAN)(Wi-Fi), Wireless broadband (Wibro), World Interoperability for Microwave Access (Wimax), or High Speed Downlink Packet Access (HSDPA).

The short-range communication unit 140 denotes a module for short-range communication. Here, Bluetooth, Radio Frequency Identification (RFID), infrared communication (IrDA: infrared Data Association), Ultra Wideband (UWB), ZigBee, Near-Field Communication (NFC), or the like may be used as short-range communication technology.

The short-range communication unit 140 according to an embodiment of the present invention may be an NFC module. The short-range communication unit 140 may receive signature content from the signature-requesting terminal 200. Further, the short-range communication unit 140 may transmit a digital signature to the signature-requesting terminal 200.

The input unit 150 generates input data allowing a user to control the operation of the mobile terminal 100. The input unit 150 may be implemented using a keypad dome switch, a touch pad (resistive/capacitive type), a jog wheel, a jog switch, or the like.

The display unit 160 displays (outputs) information processed by the mobile terminal 100. For example, when the mobile terminal 100 is in a call mode, the display unit 160 displays a User Interface (UI) or a Graphical User Interface (GUI) related to a call. When the mobile terminal 100 is in a video call mode or a capturing mode, captured and/or received images are displayed or, alternatively, a related UI or GUI is displayed.

The display unit 160 may include at least one of a Liquid Crystal Display (LCD), a Thin Film Transistor LCD (TFT LCD), an Organic Light-Emitting Diode (OLED), a flexible display, and a three-dimensional (3D) display.

Among the displays, some displays may be implemented in a transparent or light-transmissive type so that the outside of the display may be viewed through the display. This may be referred to as a transparent display, and a representative example of the transparent display includes a Transparent OLED (TOLED) or the like. The rear structure of the display unit 160 may also be implemented in a light-transmissive structure. By means of this structure, the user may view an object located behind a terminal body through an area occupied by the display unit 160 of a terminal body.

When the display unit 160 and a sensor for sensing a touch action (hereinafter referred to as a 'touch sensor') form a mutual layered structure (hereinafter referred to as a 'touch screen'), the display unit 160 may also be used as an input device as well as an output device. The touch sensor may have the form of, for example, a touch film, a touch sheet, a touch pad, etc.

The touch sensor may be configured to convert a change in pressure applied to a specific region of the display unit 160 or a change in capacitance or the like occurring in a specific region of the display unit 160 into an electrical input signal. The touch sensor may be configured to detect even pressure applied upon making a touch, as well as a touched location and area.

When a touch input to the touch sensor is present, a signal(s) corresponding to the touch input is sent to a touch controller. The touch controller processes the signal(s) and transmits data corresponding thereto to the control unit 110. In this way, the control unit 110 may recognize which region of the display unit 160 has been touched.

Below, a method for providing a digital signature according to a first embodiment of the present invention will be described in detail with reference to FIGS. 3 to 7.

Figure 3:
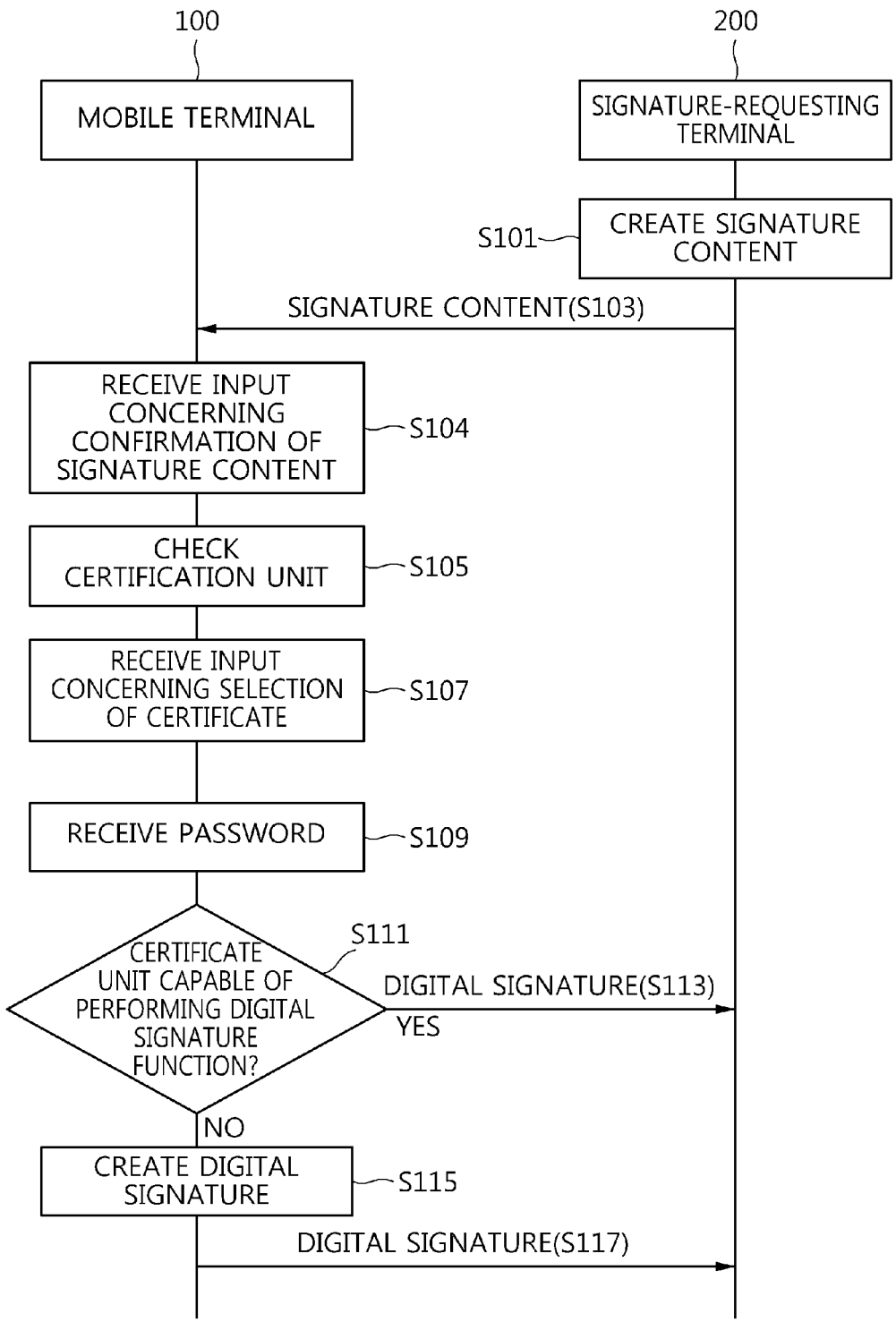
FIG. 3 is a flowchart showing a method for providing a digital signature according to a first embodiment of the present invention.

FIG. 3 is a flowchart showing a digital signature provision method according to a first embodiment of the present invention.

The signature-requesting terminal 200 creates signature content at step S101.

The signature-requesting terminal 200 transmits the signature content to the short-range communication unit 140 of the mobile terminal 100 at step S103. The transmission of the signature content may be performed by a physical touch between the signature-requesting terminal 200 and the mobile terminal 100. When the signature-requesting terminal 200 touches the mobile terminal 100, the mobile terminal 100 receives the signature content from the signature-requesting terminal 200 through an NFC module.

Figure 4:
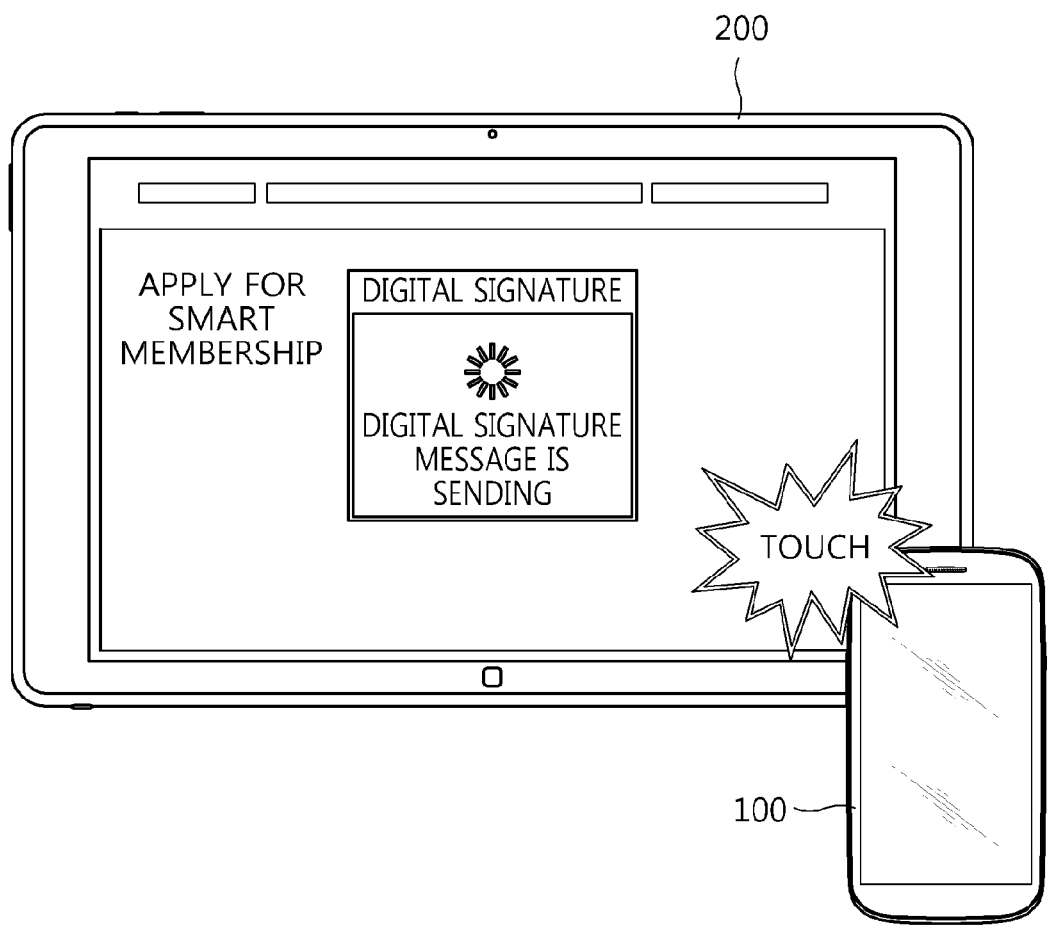
FIG. 4 is a diagram showing an example in which a signature-requesting terminal transmits signature content to a mobile terminal according to an embodiment of the present invention.

FIG. 4 is a diagram showing an example in which the signature-requesting terminal transmits signature content to the mobile terminal according to an embodiment of the present invention.

Referring to FIG. 4, upon transmitting signature content to the mobile terminal 100, the signature-requesting terminal 200 may display the content of a signature request on a screen. The signature content according to an embodiment of the present invention may include information about a company requesting a digital signature, or the purpose of a signature.

The input unit of the mobile terminal 100 receives an input concerning the confirmation of signature content at step S104.

Figure 5:
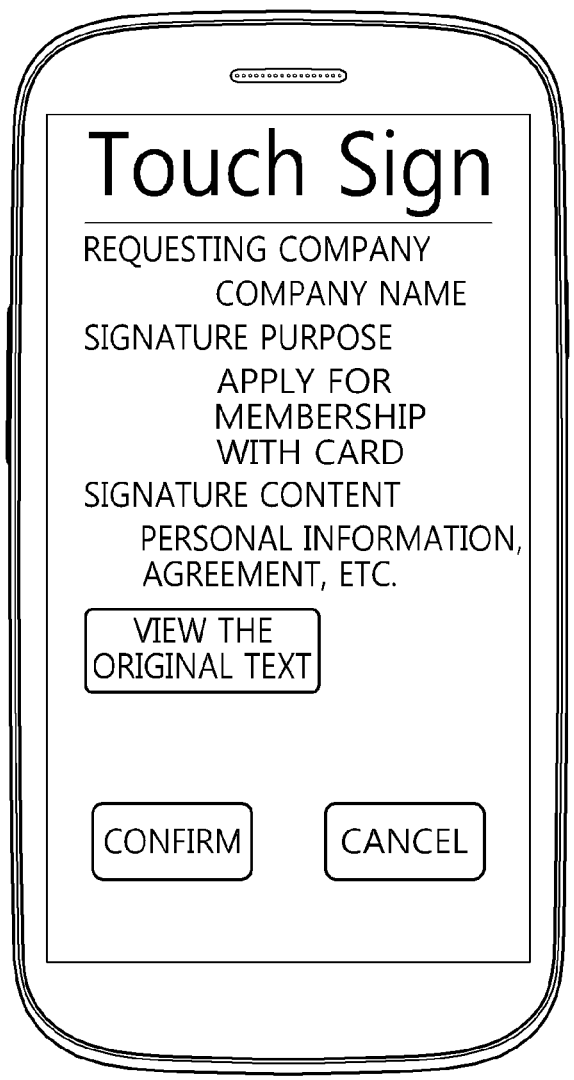
FIG. 5 is a diagram showing an example in which the mobile terminal receives an input concerning the confirmation of signature content according to an embodiment of the present invention.

FIG. 5 is a diagram showing an example in which the mobile terminal receives an input concerning the confirmation of signature content according to an embodiment of the present invention.

Referring to FIG. 5, a user confirms signature content displayed on the display unit 160 and then makes an input concerning the confirmation of signature content through the input unit 150.

The control unit 110 checks the certificate unit 120 at step S105. By means of this procedure, the type of certificate unit 120 may be checked by the control unit 110. Further, when the certificate unit 120 is a UICC or SD card, it is embedded in the mobile terminal 100, so that the control unit 110 may check the certificate unit without requiring a separate user input. In accordance with an embodiment of the present invention, when the certificate unit 120 is located outside of the mobile terminal 100, the control unit 110 connects the mobile terminal 100 to the certificate unit 120 by checking the certificate unit 120.

The input unit 150 receives an input concerning the selection of a certificate from among a plurality of certificates stored in the certificate unit 120 at step S107. The input unit 150 may also receive a selection input for a certificate related to the signature content.

Figure 6:
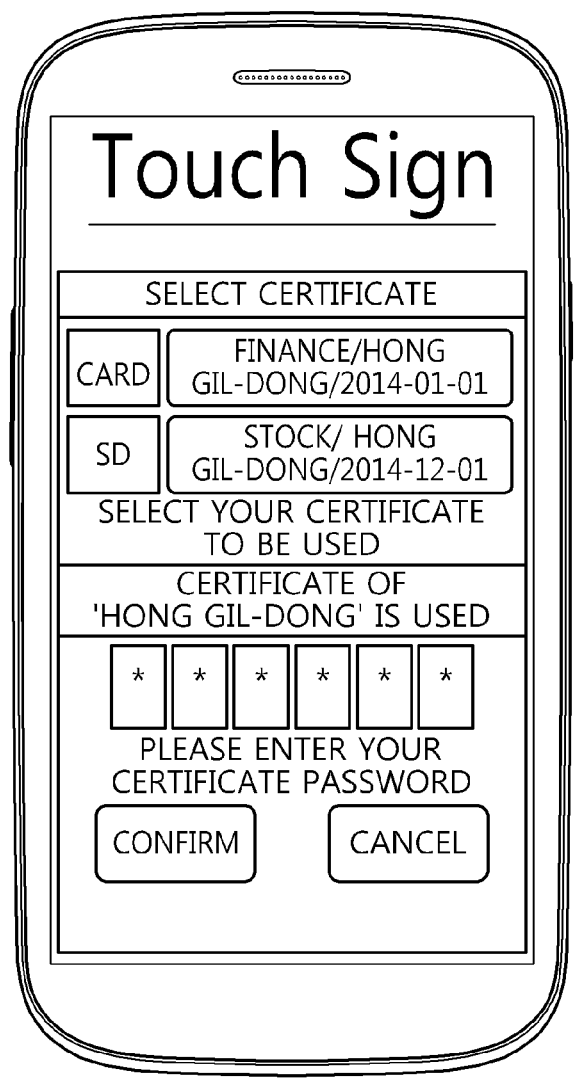
FIG. 6 is a diagram showing an example in which the mobile terminal receives an input concerning the selection of a certificate according to an embodiment of the present invention.

FIG. 6 is a diagram showing an example in which the mobile terminal receives an input concerning the selection of a certificate according to an embodiment of the present invention.

Referring to FIG. 6, the certificate unit 120 may store one or more certificates. The display unit 160 displays one or more certificates stored in the certificate unit 120. The user selects one from among the displayed certificates and makes an input concerning the selection of the certificate. The input of the user concerning the selection of the certificate is received through the input unit 150.

The input unit 150 receives a password for the selected certificate as the input concerning the selection of the certificate at step S109.

Thereafter, the control unit 110 determines whether the certificate unit 120 is capable of performing a digital signature function corresponding to the selected certificate at step S111. If it is determined that the certificate unit 120 is capable of performing the digital signature function corresponding to the selected certificate, the control unit 110 commands the certificate unit 120 to create a digital signature. The certificate unit 120 creates a digital signature based on a private key corresponding to the selected certificate in compliance with the command of the control unit 110.

The short-range communication unit 140 transmits the digital signature created in accordance with the selected certificate by the certificate unit 120 to the signature-requesting terminal 200 at step S113.

If it is determined that the certificate unit 120 is not capable of performing the digital signature function corresponding to the selected certificate, the control unit 110 creates a digital signature based on a private key corresponding to the certificate selected from the certificate unit 120 at step S115. In this case, the control unit 110 may inquire whether a private key corresponding to the certificate selected from the certificate unit 120 is stored.

The short-range communication unit 140 transmits the digital signature created by the control unit 110 to the signature-requesting terminal 200 at step S117.

Figure 7:
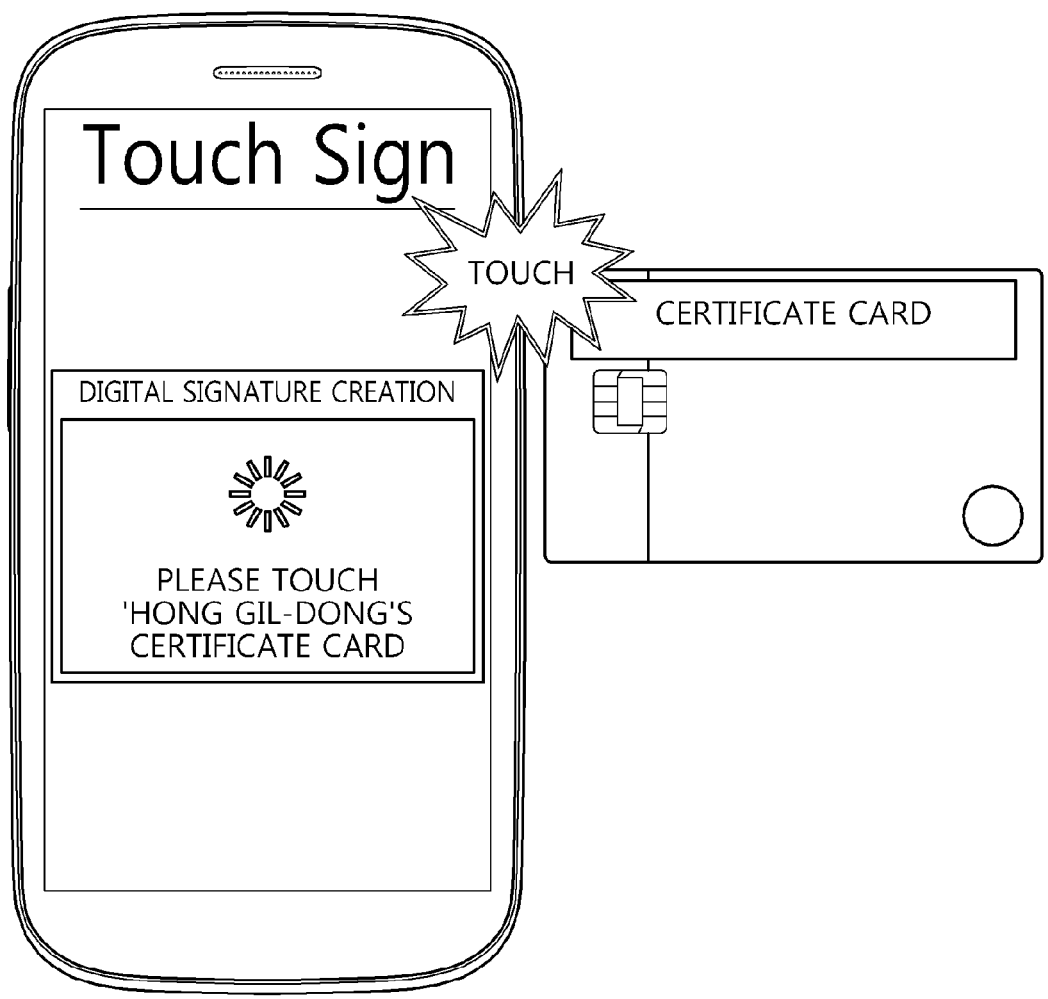
FIG. 7 is a diagram showing a state in which a certificate card for digital signature touches the mobile terminal according to an embodiment of the present invention.

FIG. 7 is a diagram showing a state in which a certificate card for a digital signature touches a mobile terminal according to an embodiment of the present invention.

Referring to FIG. 7, in order for the mobile terminal 100 to acquire a digital signature from a certificate card located outside of the mobile terminal 100, the certificate card must touch the mobile terminal 100. Here, the mobile terminal 100 receives signature content or a private key from the certificate card through the short-range communication unit 140 or the NFC module. In this case, the certificate card may also include a short-range communication unit. In this regard, the certificate card may include an NFC module or an NFC antenna. While the control unit 110 creates a digital signature based on the private key of the certificate card, a touch between the certificate card and the mobile terminal 100 may need to be maintained in some cases.

The short-range communication unit 140 transmits the digital signature created by the certificate unit 120 to the signature-requesting terminal 200 at step S117. Further, the short-range communication unit 140 may also transmit the digital signature created by the control unit 110 to the signature-requesting terminal 200.

Below, a digital signature provision method according to a second embodiment of the present invention will be described in detail with reference to FIGS. 8 to 11.

Figure 8:
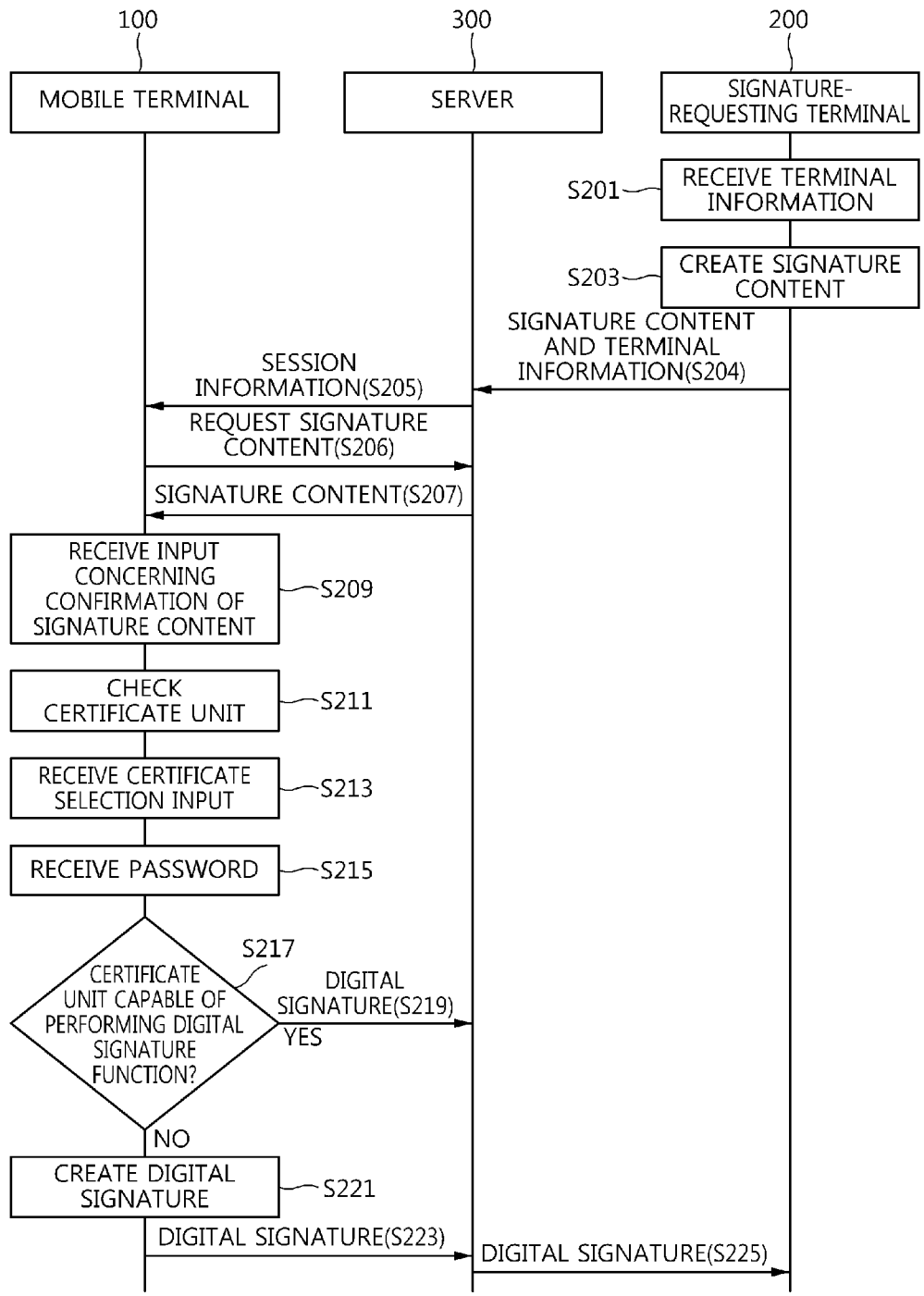
FIG. 8 is a flowchart showing a method for providing a digital signature according to a second embodiment of the present invention.

FIG. 8 is a flowchart showing a digital signature provision method according to a second embodiment of the present invention.

The digital signature provision method according to the second embodiment of the present invention is identical to that of the first embodiment, except the following components which will be described.

In particular, FIG. 8 illustrates a method by which the mobile terminal 100 provides a digital signature when the mobile terminal 100 does not include an NFC module.

The signature-requesting terminal 200 receives terminal information at step S201. The terminal information according to an embodiment of the present invention may include the phone number of the mobile terminal 100. Further, the terminal information according to the embodiment of the present invention may also include the identification (ID) code of the mobile terminal 100, or the ID of the user of the mobile terminal 100 stored in the server 300. Furthermore, the terminal information may include information about the user of the mobile terminal 100.

Figure 9:
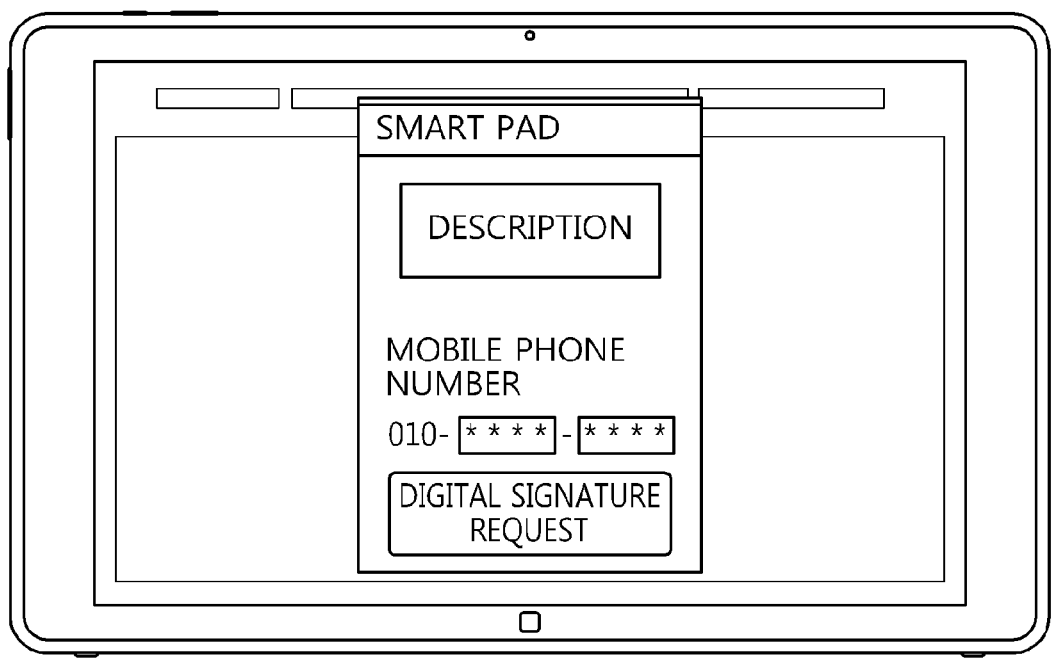
FIG. 9 is a diagram showing an example in which the signature-requesting terminal receives mobile terminal information according to an embodiment of the present invention.

FIG. 9 is a diagram showing an example in which a signature-requesting terminal receives mobile terminal information according to an embodiment of the present invention.

Referring to FIG. 9, the signature-requesting terminal 200 may receive the phone number of the mobile terminal 100 through the display unit 160 or the input unit 150.

The signature-requesting terminal 200 creates signature content at step S203. Here, the signature-requesting terminal 200 may create a security code.

Figure 10:
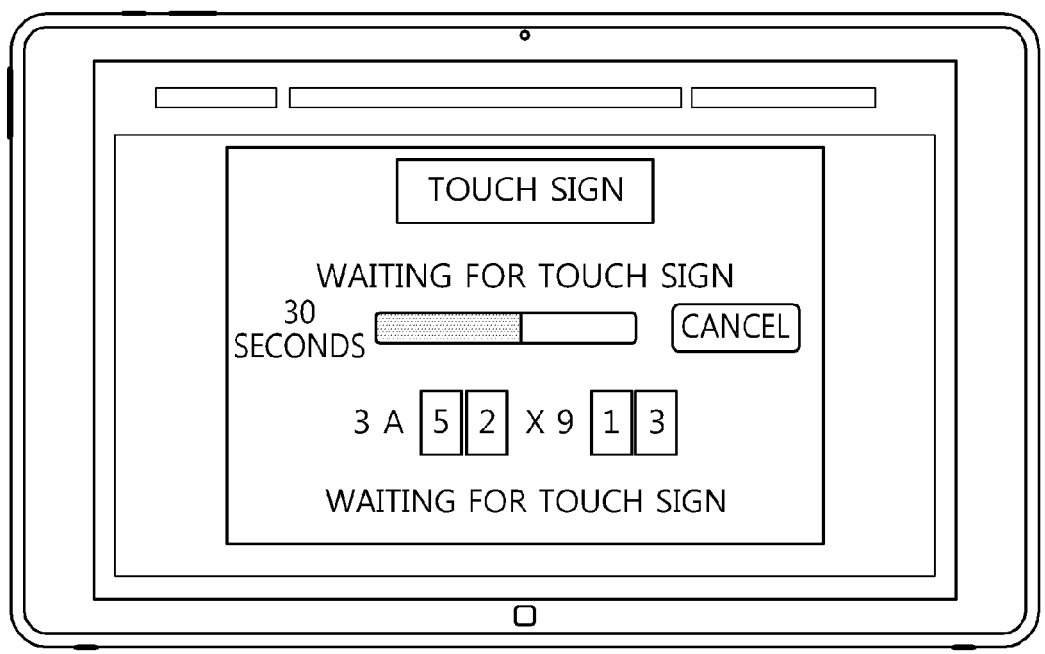
FIG. 10 is a diagram showing a screen on which a security code to be transmitted to the mobile terminal is created according to an embodiment of the present invention.

FIG. 10 is a diagram showing a screen on which a security code to be transmitted to the mobile terminal is created according to an embodiment of the present invention.

The security code is composed of values of any character string that is randomly generated to prevent the server 300 from perceiving the signature content. For example, when a security code is implemented as an 8-digit code, the mobile terminal 100 that received the security code displays 8-digit information on the screen. However, the signature-requesting terminal 200 may process any 4 digits as hidden values by indicating the hidden values by asterisks (*) and transfer resulting 8-digit information to the server 300. That is, the signature-requesting terminal 200 transmits a partially hidden security code to the server 300. The signature-requesting terminal 200 generates an encryption key, required to encrypt the signature content, using a hash function. In this case, the signature-requesting terminal 200 may perform the encryption of signature content, the generation of an encryption key, or the creation of a security code using a separate application or program.

The signature-requesting terminal 200 generates an encryption key based on the security code. For example, the signature-requesting terminal 200 may generate an encryption key using a security code (SHA256).

The signature-requesting terminal 200 may encrypt the signature content using the encryption key and transfer the encrypted signature content to the server 300. Via the above processing, the signature content may be prevented from being leaked to the user of the server 300.

The signature-requesting terminal 200 transmits the signature content and terminal information to the server 300 at step S204. The signature-requesting terminal 200 may transmit the signature content to the server 300 over a network. In accordance with an embodiment of the present invention, the signature-requesting terminal 200 may transmit a security code, together with the signature content. The security code at this time may be partially hidden. Further, the signature content at this time may be encrypted by the signature-requesting terminal 200.

The server 300 transmits session information to the external communication unit 130 of the mobile terminal 100 at step S205. The server 300 may transmit the session information to the external communication unit 130 of the mobile terminal 100 based on the received terminal information. The session information according to an embodiment of the present invention may include notification information indicating that the server 300 has received the signature content. That is, the server 300 transmits the session information to the external communication unit 130 in response to the received signature content. In this case, the transmission of the session information by the server may be performed using a push method. The mobile terminal 100 that receives the session information may also execute an application related to the creation or transmission of a digital signature. Therefore, according to the embodiment of the present invention, the user of the mobile terminal 100 does not need to manually execute the application.

Thereafter, the external communication unit 130 of the mobile terminal 100 requests signature content from the server 300. In this case, the external communication unit 130 of the mobile terminal 100 may request a security code, together with signature content, from the server 300. Further, the external communication unit 130 of the mobile terminal 100 may transmit a user identifier to the server 300.

The server 300 checks the user identifier and transmits the signature content to the external communication unit 130 of the mobile terminal 100 at step S207. Here, the server 300 may transmit a security code, together with the signature content, to the external communication unit 130 of the mobile terminal 100. The security code at this time may be partially hidden. The user identifier according to an embodiment of the present invention may be information about the user of the mobile terminal 100 that has been shared in advance between the server 300 and the mobile terminal 100. Therefore, even if a terminal, the session information of which is intercepted by a malicious application, requests the transmission of signature content, the server 300 does not transmit signature content to a terminal which did not transmit a user identifier. That is, the server 300 according to the embodiment of the present invention transmits signature content only to the mobile terminal 100 of an authorized user, that is, the mobile terminal 100, with which the server 300 has shared a user identifier in advance. Further, the signature content transmitted from the server 300 may be encrypted by the signature-requesting terminal 200.

The server 300 determines whether the received user identifier is that of the user who has been previously registered in the server 300. If the user is the previously registered user, the server 300 checks whether the phone number of the mobile terminal 100 included in the terminal information transmitted from the signature-requesting terminal 200 matches the phone number of the mobile terminal 100 that transmitted the corresponding user identifier, and thus it may be determined whether the user of the mobile terminal 100 that transmitted the user identifier is an authorized user.

The input unit 150 of the mobile terminal 100 receives an input concerning the confirmation of the signature content at step S209.

The user confirms the signature content displayed on the display unit 160 and makes an input concerning the confirmation of the signature content through the input unit 150.

In accordance with the embodiment of the present invention, before receiving an input concerning the confirmation of the signature content, the input unit 150 of the mobile terminal 100 may receive an input corresponding to a hidden field of a security code.

The display unit 160 displays a partially hidden security code received from the server 300 on the screen. Thereafter, the input unit 150 receives characters or numerals corresponding to the hidden field of the security code. When an input corresponding to the hidden field of the security code received through the input unit 150 matches the content of the hidden field of the security code, the control unit 110 generates an encryption key. The control unit 110 decrypts the signature content using the generated encryption key.

Figure 11:
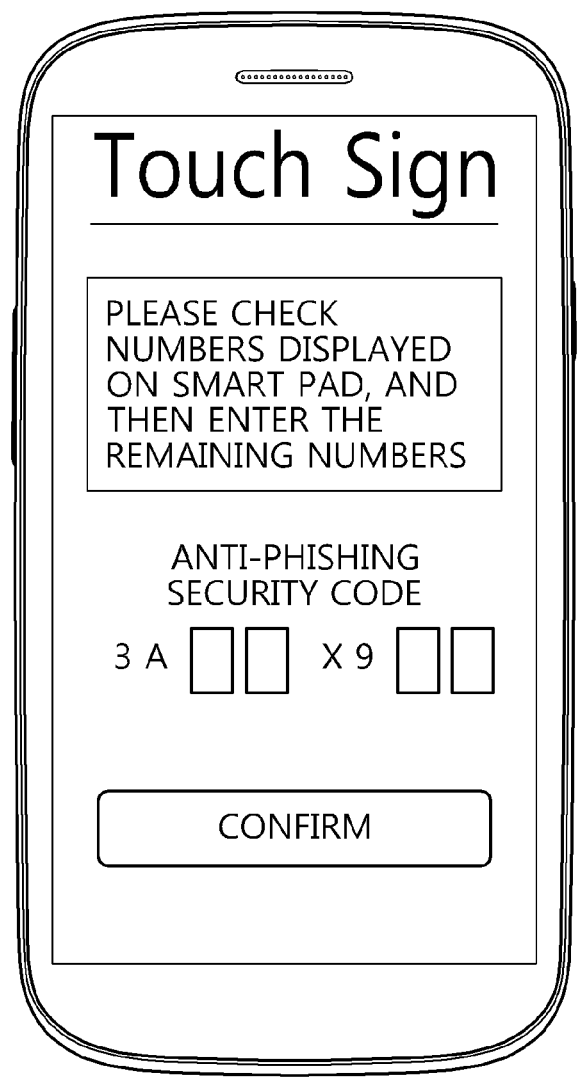
FIG. 11 is a diagram showing an example in which the mobile terminal receives an input corresponding to a hidden field of a security card according to an embodiment of the present invention.

FIG. 11 is a diagram showing an example in which the mobile terminal receives an input corresponding to a hidden field of a security code according to an embodiment of the present invention.

Referring to FIG. 11, the control unit 110 requests the user to input characters or numerals corresponding to a hidden field of a security code. Such a request may be output via the display unit 160.

A description will be made below on the assumption that the signature-requesting terminal 200 creates an 8-digit security code of '3A525913'. That is, the signature-requesting terminal 200 transmits a security code, part of which is hidden by asterisks (*), that is, a code of '3AX9', to the server 300.

The server 300 forwards the partially hidden security code to the mobile terminal 100. Thereafter, the input unit 150 receives characters or numerals corresponding to the hidden field of the security code. When input values corresponding to the hidden field of the security code received through the input unit 150 are sequentially '5', '2', '1', and '3', the control unit 110 generates an encryption key. The control unit 110 decrypts the signature content using the generated encryption key.

A procedure after step S209 will be described below. The user confirms the signature content displayed on the display unit 160, and makes an input concerning the confirmation of the signature content through the input unit 150.

The control unit 110 checks the certificate unit 120 at step S211. The control unit 110 may determine the type of certificate unit 120 through this procedure.

When the certificate unit 120 is a UICC or SD card, it is embedded in the mobile terminal 100, and thus the control unit 110 may check the certification unit 120 without a separate user input.

In accordance with an embodiment of the present invention, when the certificate unit 120 is located outside of the mobile terminal 100, the control unit 110 connects the mobile terminal 100 to the certificate unit 120 by checking the certificate unit 120.

The input unit 150 receives an input concerning the selection of a certificate from among certificates stored in the certificate unit 120 at step S213. The input unit 150 may also receive a selection input for a certificate related to the signature content.

The certificate unit 120 may store one or more certificates. The display unit 160 displays the one or more certificates stored in the certificate unit 120.

The user selects any one from among displayed certificates and makes an input concerning the selection of the certificate. The input concerning the selection of the certificate by the user is received by the input unit 150.

The input unit 150 receives a password for the selected certificate as the input concerning the selection of the certificate at step S215.

Thereafter, the control unit 110 determines whether the certificate unit 120 is capable of performing a digital signature function corresponding to the selected certificate at step S217. If it is determined that the certificate unit 120 is capable of performing the digital signature function corresponding to the selected certificate, the control unit 110 commands the certificate unit 120 to create a digital signature. The certificate unit 120 creates a digital signature based on a private key in compliance with the command from the control unit 110.

The external communication unit 130 transmits the digital signature created by the certificate unit 120 to the server 300 at step S219.

In contrast, if it is determined that when the certificate unit 120 is not capable of performing the digital signature function corresponding to the selected certificate, the control unit 110 creates a digital signature based on a private key corresponding to the certificate selected from the certificate unit 120 at step S221. In this case, the control unit 110 may inquire whether a private key corresponding to the certificate selected from the certificate unit 120 is stored.

The external communication unit 130 transmits the digital signature created by the control unit 110 to the server 300 at step S223.

The server 300 transmits the received digital signature to the signature-requesting terminal 200 at step S225.

In accordance with an embodiment of the present invention, when a mobile terminal includes a short-range communication unit, a digital signature may be transmitted to a signature-requesting terminal through the short-range communication unit.

Further, in accordance with an embodiment of the present invention, when a mobile terminal does not include a short-range communication unit, a digital signature may be transmitted to a signature-requesting terminal over an external communication network.

Furthermore, in accordance with an embodiment of the present invention, only an authorized user may receive signature content using a security code.

As described above, although preferred embodiments of the present invention have been described in detail, the scope of the present invention is not limited thereto, and those skilled in the art will appreciate that various modifications and changes based on the basic concept of the present invention are possible without departing from the scope and spirit of the invention as disclosed in the accompanying claims.

What is claimed is:

1. An apparatus for providing a digital signature, comprising:
   a certificate unit configured to store one or more certificates and to generate digital signatures based on private keys corresponding to the one or more certificates;
   a display unit configured to display certificate information based on signature content received from a signature-requesting terminal;
   an input unit for receiving a selection input for a certificate related to the displayed certificate information; and
   a control unit for determining whether the certificate unit is capable of performing a digital signature generation function corresponding to a selected certificate,
   wherein, the control unit is configured to command the certificate unit to create the digital signature based on a private key corresponding to the selected certificate based on determining that the certificate unit is capable of performing the digital signature generation function, wherein, the control unit is configured to create the digital signature based on a private key corresponding to the selected certificate based on determining that the certificate unit is not capable of performing the digital signature generation function, and wherein the control unit is configured to transmit the digital signature to the signature-requesting terminal.

2. The apparatus of claim 1, further comprising a short-range communication unit, wherein when a touch with the signature-requesting terminal is made, the control unit receives the signature content from the signature-requesting terminal through the short-range communication unit.

3. The apparatus of claim 2, wherein when the certificate unit is located outside of the apparatus, the short-range communication unit receives the digital signature from the certificate unit when the certificate unit is touched.

4. The apparatus of claim 3, wherein the short-range communication unit is a Near-Field Communication (NFC) module.

5. The apparatus of claim 1, further comprising an external communication unit for receiving the signature content from the signature-requesting terminal through a server.

6. The apparatus of claim 5, wherein the external communication unit transmits the digital signature to the signature-requesting terminal.

7. The apparatus of claim 6, wherein:

the signature content is encrypted using an encryption key by the signature-requesting terminal, and the encryption key is generated based on a security code by the signature-requesting terminal, and the control unit generates an encryption key based on the security code, and decrypts the signature content using the encryption key.

8. The apparatus of claim 7, wherein:

the external communication unit receives a partially hidden security code, together with the signature content, through the server, and the control unit is configured to, when the input received through the input unit matches a hidden field of the security code, generate an encryption key based on the security code.

9. The apparatus of claim 5, wherein the external communication unit receives session information corresponding to the signature content received by the server, transmits a user identifier to the server in response to the session information, and receives signature content transmitted from the server when the user identifier matches a user identifier transmitted from the signature-requesting terminal to the server.

10. The apparatus of claim 9, wherein the user identifier is user information that has been shared with the signature-requesting terminal in advance.

11. A method for providing a digital signature, comprising:

displaying, by a display unit, certificate information based on signature content received from a signature-requesting terminal;

receiving, by an input unit, a selection input for a certificate related to the displayed certificate information;

determining, by a control unit, whether the certificate unit is capable of performing a digital signature generation function corresponding to a selected certificate;

commanding, by the control unit, the certificate unit to create the digital signature based on a private key corresponding to the selected certificate based on determining that the certificate unit is capable of performing the digital signature generation function;

creating, by the control unit, the digital signature based on the private key corresponding to the selected certificate based on determining that the certificate unit is not capable of performing the digital signature generation function; and transmitting, by the control unit, the digital signature to the signature-requesting terminal.

12. The method of claim 11, further comprising, when a touch with the signature-requesting terminal is made, receiving the signature content from the signature-requesting terminal through a short-range communication unit.

13. The method of claim 12, further comprising, when the certificate unit is located outside, receiving, by the short-range communication unit, the digital signature from the certificate unit when the certificate unit is touched.

14. The method of claim 13, wherein the short-range communication unit is a Near-Field Communication (NFC) module.

15. The method of claim 11, further comprising receiving, by an external communication unit, the signature content from the signature-requesting terminal through a server.

16. The method of claim 15, further comprising transmitting, by the external communication unit, the digital signature to the signature-requesting terminal.

17. The method of claim 16, wherein:

the signature content is encrypted using an encryption key by the signature-requesting terminal, and the encryption key is generated based on a security code by the signature-requesting terminal, and the method further comprises generating, by the control unit, the encryption key based on the security code, and decrypting, by the control unit, the signature content using the encryption key.

18. The method of claim 17, further comprising:

receiving, by the external communication unit, a partially hidden security code, together with the signature content, through the server; and generating, by the control unit, an encryption key based on the security code when the input received through the input unit matches a hidden field of the security code.

19. The method of claim 15, wherein receiving, by the external communication unit, the signature content from the signature-requesting terminal through the server comprises:

receiving, by the external communication unit, session information corresponding to the signature content received by the server;

transmitting, by the external communication unit, a user identifier to the server in response to the session information; and receiving, by the external communication unit, signature content transmitted from the server when the user identifier matches a user identifier transmitted from the signature-requesting terminal to the server.

20. The method of claim 19, wherein the user identifier is user information that has been shared with the signature-requesting terminal in advance.

* * * * *